No. 817,872. PATENTED APR. 17, 1906.
C. F. PINKHAM.
MACHINE FOR FORMING LACING TIPS.
APPLICATION FILED JUNE 8, 1905.

Witnesses:
J. Henry Parker
Bessie G. Morris

Inventor:
Charles F. Pinkham
by Macleod, Calver, Cushman & Dike
Attorneys

No. 817,872. PATENTED APR. 17, 1906.
C. F. PINKHAM.
MACHINE FOR FORMING LACING TIPS.
APPLICATION FILED JUNE 8, 1905.

Witnesses:
J. Henry Parker
Bessie G. Morris

Inventor:
Charles F. Pinkham
by Macleod, Calver, Cushman & Dike
Attorneys.

No. 817,872. PATENTED APR. 17, 1906.
C. F. PINKHAM.
MACHINE FOR FORMING LACING TIPS.
APPLICATION FILED JUNE 8, 1905.

Witnesses:
J. Henry Parker
Burns G. Morris

Inventor.
Charles F. Pinkham
by Macleod, Calver, Cushman & Co.
Attorneys.

No. 817,872. PATENTED APR. 17, 1906.
C. F. PINKHAM.
MACHINE FOR FORMING LACING TIPS.
APPLICATION FILED JUNE 8, 1905.

Witnesses:
J. Henry Parker
Bessie G. Morris

Inventor:
Charles F. Pinkham
by Macleod, Calver, Cushman & Dike
Attorneys No. 817,872. PATENTED APR. 17, 1906.
C. F. PINKHAM.
MACHINE FOR FORMING LACING TIPS.
APPLICATION FILED JUNE 8, 1905.

Witnesses:
J. Henry Parker
Bessie G. Morris

Inventor:
Charles F. Pinkham
by MacLeod, Calver, Cushman & Bake
Attorneys

No. 817,872. PATENTED APR. 17, 1906.
C. F. PINKHAM.
MACHINE FOR FORMING LACING TIPS.
APPLICATION FILED JUNE 8, 1905.

Witnesses:
J. Henry Parker
Bessie G. Morris

Inventor:
Charles F. Pinkham
by Macleod, Calver, Cushman & Drake
Attorneys

No. 817,872. PATENTED APR. 17, 1906.
C. F. PINKHAM.
MACHINE FOR FORMING LACING TIPS.
APPLICATION FILED JUNE 8, 1905.

Witnesses:
J. Henry Parker
Bessie G. Morris

Inventor:
Charles F. Pinkham
by Macleod, Calver, Cushman & Bliss
Attorneys.

UNITED STATES PATENT OFFICE.

CHARLES F. PINKHAM, OF BOSTON, MASSACHUSETTS, ASSIGNOR TO FRANK W. WHITCHER, OF BOSTON, MASSACHUSETTS.

MACHINE FOR FORMING LACING-TIPS.

No. 817,872.      Specification of Letters Patent.      Patented April 17, 1906.

Application filed June 8, 1905. Serial No. 264,240.

*To all whom it may concern:*

Be it known that I, CHARLES F. PINKHAM, a citizen of the United States, residing at Boston, county of Suffolk, State of Massachusetts, have invented a certain new and useful Improvement in Machines for Forming Lacing-Tips, of which the following is a specification, reference being had therein to the accompanying drawings.

My invention has for its object to provide a machine for the manufacture of composition tips of laces for shoes and like articles of the kind shown and described in United States Letters Patent No. 772,338 to Edwin M. S. Chandler. The tip there shown is produced by turning or tucking in the end of the tubular material from which the lacing is made, filling the turned-in end with some suitable flowing composition, and then subjecting the whole to pressure in dies of proper shape, thus causing the filling material to set and to form a hard tip for the end of the lacing.

The machine described in this application is intended more especially for forming the tip on one end only of a lacing; but in practice where a tip is required at each end of a lacing I propose to use another machine, similar to that described in my present application, but oppositely arranged and placed, which shall be simultaneously forming the tip on the other end of the lacing. I also propose to provide automatic feeding, measuring, and folding mechanism which shall supply the tipping-machines with portions of lacing of the desired length and which shall fold the lacing after the tips have been applied. These I contemplate shall form the subject of further applications for United States Letters Patent.

My machine is also adapted to be used for the production of other articles besides lacings which are composed of tubular fabric the ends of which are turned in.

The machine of my present invention is composed of several distinct groups of mechanism which coöperate to perform upon the lacing the necessary operations and to transfer the lacing from one position to another automatically. The progress of the lacing through the machine is substantially as follows: It is placed by the operator or fed from a reel into a position where it is seized by a gripper and severed from the line of material or has its end cut off, as the case may be. It is then moved into the position where the turning in takes place, the end of the lacing being dilated or distended during the turning in. The lacing is then moved to the dies, where the distended portion is filled with the composition and the whole is compressed to form the finished lacing-tip.

It will thus be seen that the machine naturally divides itself into the following primary groups of mechanism, viz: cutting mechanism, turning-in mechanism, filling or cement-applying mechanism, and compressing mechanism. Various transferring mechanisms, by which the lacing is moved from one group of primary mechanism to another, are also provided.

While I have shown my invention as embodied in a machine of particular form and structure, I believe my invention to be a very broad one, and I do not desire to limit myself to the particular form illustrated in the drawings and described in the specification, since the invention may be otherwise embodied without departing from its spirit.

The invention will be fully understood from the following description, taken in connection with the accompanying drawings, and the novel features thereof are pointed out and clearly defined in the claims at the close of this specification.

Figure 1:
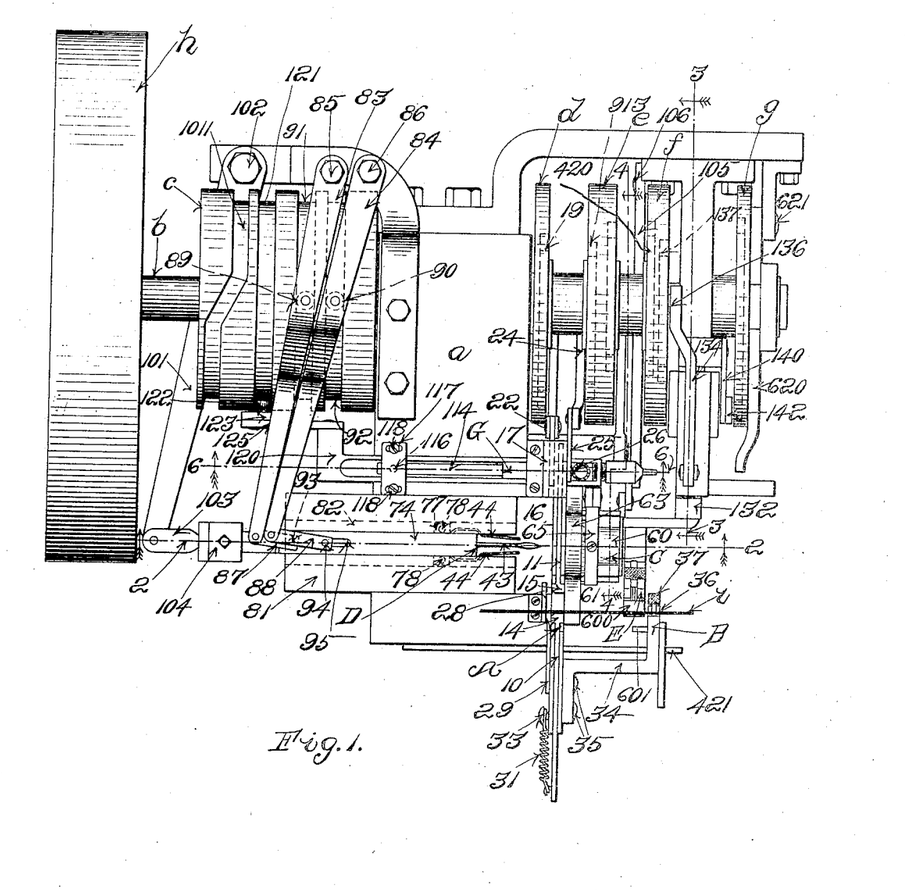
Figure 1 is a plan view of a machine embodying my invention.

Referring now to the drawings, and particularly to Fig. 1, the frame of the machine is indicated at $a$, and the main shaft at $b$. A series of cams $c$, $d$, $e$, $f$, and $g$, which drive the various parts of the machine and will be later described, are mounted upon the main shaft, which is self driven by a pulley $h$, upon which runs a belt or chain. (Not necessary to be shown.) The frame $a$ of the machine is of convenient shape to support the various operative parts of the mechanism and may be constructed of a single piece of cast-iron or may be built up from a number of smaller pieces, as is most convenient.

As previously seen, the machine is divided into a number of different primary groups of mechanism, each of which performs one of the operations necessary for the completion of the finished tip. In my description I will follow the lacing in its progress through the machine, describing each of these groups of mechanism, and will begin with the cutting mechanism.

Figures 8, 9, 10, 11, 17:
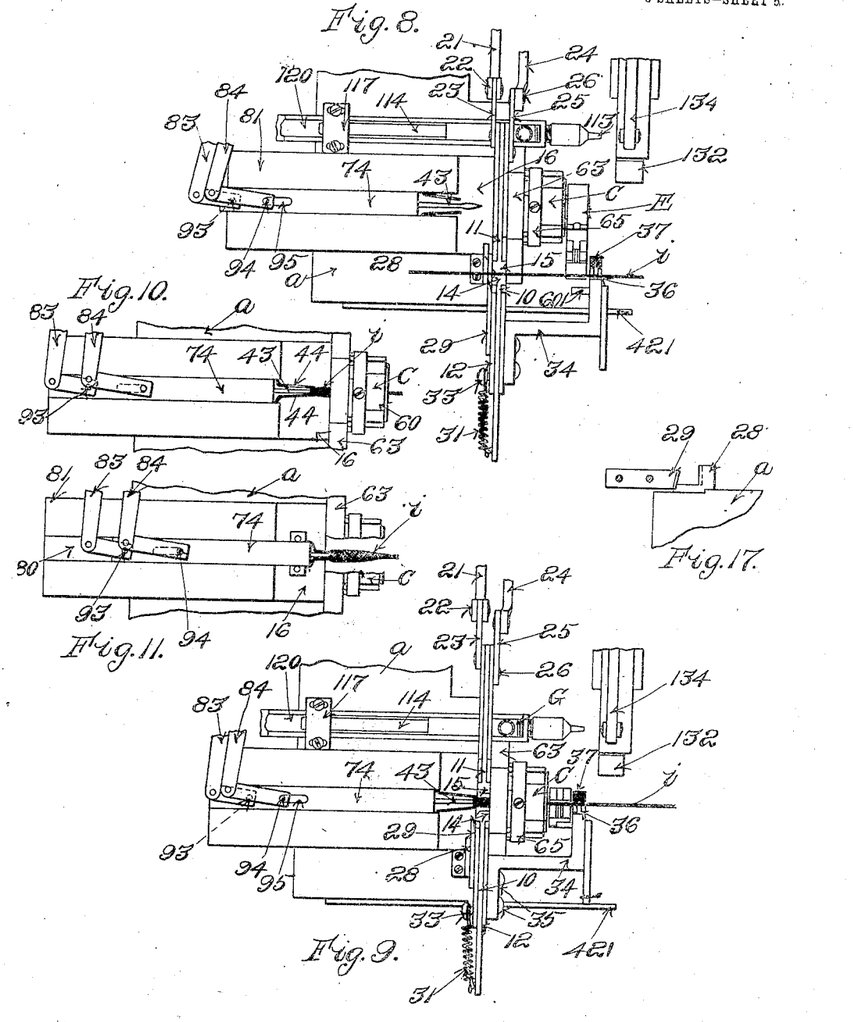
Figs. 8 to 12, inclusive, show successive positions of the turning-in devices and certain related parts.
Fig. 17 is a detail of the cutters.

Referring now to Figs. 1, 2, 7, and 8, the lacing, which is composed of a tubular fabric of the proper size, is indicated at $i$. It may be fed from a reel or laid into the proper position by hand. When in this position, it lies along the front of the machine and is between the two hammer-headed gripping members 10 and 11, which slide in a movable grooved slideway 12. The construction of the slideway 12 is more clearly seen in Fig. 7, there being a notch or cut-away space 13 for the reception and movement of the heads 14 and 15 of the gripping members 10 and 11. The slideway 12 is guided in a slot 912 in the frame $a$ of the machine and by the plates 16 and 17 at the left-hand side of the machine, as seen in Fig. 1, and on the opposite side or right-hand side by the bracket 63. The slideway 12 is moved to and fro by means of the cam $d$, (see Figs. 1 and 7,) provided with a cam-path 19, in which travels a cam-roll 20, which actuates the bell-crank lever 21. The upper end of the bell-crank lever 21 is pivoted at 22 to a link 23, attached to the rear end of the slideway 12. The gripping member 11 is actuated by groove 913 in the plate-cam $e$ through the bell-crank lever 24 and link 25, the link 25 and gripping member 11 being connected by a stud 26. A slot 27 (see Fig. 7) is formed in the side of the slideway 12, and thus permits movement of the gripping member independent of the slideway. A fixed knife 28 is attached to the frame of the machine in a suitable manner, and a movable knife 29 is secured to the left-hand side of the slideway 12. These knives sever the lacing from the piece if a continuous piece of material on a reel or other feeding means be used or clip off the end of the lacing preparatory to the turning-in process where the machine is fed by hand. The lacing is fed into proper position while the parts of the machine now being referred to are in the position shown in Fig. 7 and are standing still. Rotation of the cam $d$ causes the slideway 12 and the gripping member 10 thereon to move forward and to pinch the lace $i$ against the other gripping member 11, as seen in Fig. 8, this movement being permitted by the slot 27 in the slideway 12. The gripping member 10 applies a yielding pressure to the lace by means of the spring 31, attached to the hook on the gripping member 10 and to the stud 33 on the slideway 12. It will thus be seen that the lacing $i$ is firmly held at one point by the just-described group of members, which I will designate by A and will hereinafter call the "cutter-gripper." The lacing $i$ is held at a second point at the right of the first-mentioned point by a second group of members, which I will call the "side gripper" and designate by B. This side gripper B (see Fig. 19) consists of a bracket 34, attached to the slideway 12 by the screws 35 and provided at its end with a checkered surface 36. A movable jaw 37 is pivoted to the bracket 34 at 38 and is actuated at the proper time by the pivoted cam-piece 40. A spring 42 tends to pull the said cam-piece 40 toward the under side of the bracket 34 as soon as the side gripper B is moved toward the turning-in position far enough to release the lower end of the cam-piece 40 from the stop 421. The jaw 37 is provided with a finger 371, which engages a cam-surface on the cam-piece 40 and causes the jaw 37 to open or shut when the cam-piece 40 is moved about its pivot by the action of the spring 42 or of the projection 401, which engages a pin on a lace-carrier, as will be hereinafter described. It will thus be seen that action between the cam-piece 40 and finger 371 is substantially that of two gear-teeth and that movement of the cam-piece 40 in one direction opens and in the other direction closes the movable jaw 37. It will also be seen that the lacing is held at one point by the cutter-gripper A and at another point a short distance away by a side gripper B. The intermediate portion of the lacing between the two grippers A and B is substantially straight. After the cutter-gripper has closed upon the lacing, as previously explained, the cam $d$ moves both the cutter-gripper A and the side gripper B, which closes upon the lacing just as this movement begins toward the turning-in position. As the lacing passes the knives 28 and 29 it is sheared off. The continued motion of the parts carries the lacing to the turning-in position shown in Fig. 9. The lacing is then located with its axis substantially coinciding with the axis of the chuck C, which forms one-half of the turning-in mechanism. At this point the cutter-gripper A rests and the lacing is in position for the turning-in process to begin.

The turning-in mechanism consists of two sets of elements—viz., the chuck C, which operates upon the exterior of the lace, and the central support or spear 43 and gripping members 44, constituting the elements which operate upon the interior of the lacing during the turning-in process.

The chuck C, which will be clearly seen from reference to Figs. 2, 3, 4, and 8, is composed of a barrel 60, provided with slots, in which slide the four longitudinal members or jaws 61, which have their inner surfaces 62 serrated, checkered, or roughened, so that a proper contact with the lacing on the exterior of the spear or central support 43 is obtained and all movement of the lacing longitudinally of the chuck is prevented. The barrel 60 is carried on a bracket 63, attached by screws 64 to the frame a of the machine. The longitudinal chuck-jaws 61 are pressed inwardly toward the center of the barrel by the flat springs 65 and 66, which are fastened to projections 67 and 68 on the barrel of the chuck. This arrangement of springs permits the chuck-jaws 61 to exert a yielding pressure upon the lacing. The chuck-jaws 61 are each provided on their left-hand ends, as seen in Fig. 18, with projections 69, which extend beyond the end of the barrel 60 of the chuck and contact with a cam 70, which is mounted upon the barrel 60 of the chuck and is free to rotate about the longitudinal axis of the said chuck. The cam 70 on the barrel 60 is operated by a cam-slot in the plate-cam e, this cam also being provided with the cam-slot 913, which operates the gripping member 12 of the cutter-gripper A, heretofore described. By proper timing of the cams the chuck-jaws 61 are closed at the moment the lacing is carried into position and thereafter by their serrations prevent any longitudinal movement on the part of the lacing as it is dilated or distended by the action of the interior turning-in members.

Figures 2, 5:
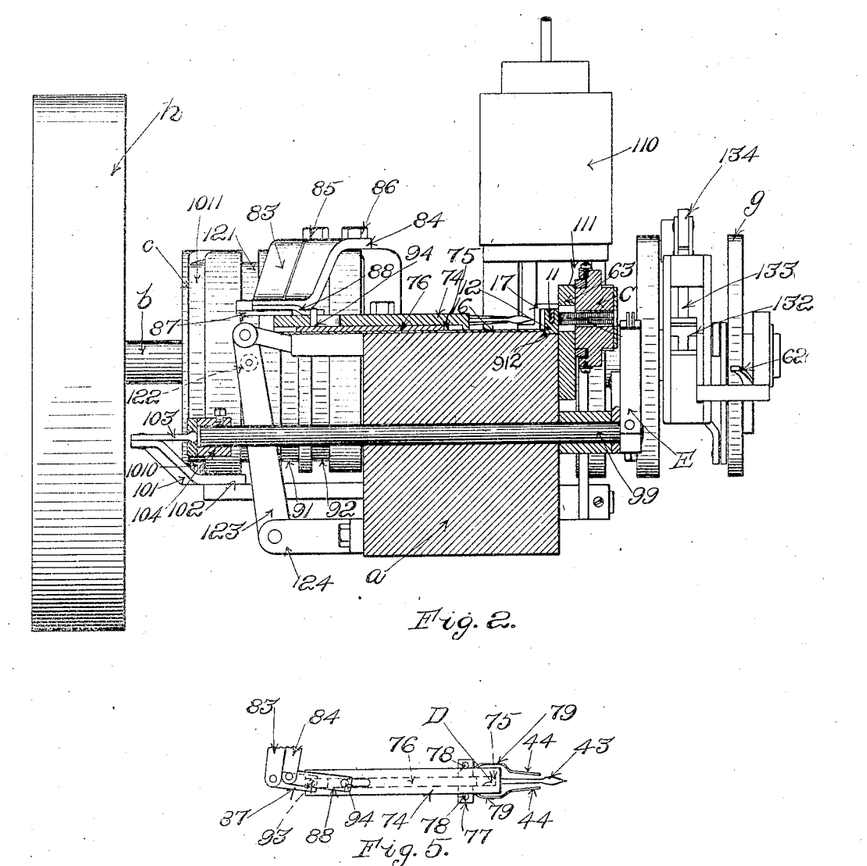
Fig. 2 is a section on line 2 2, Fig. 1, looking in the direction of the arrows.
Fig. 5 is a detail of the spear or central supporting member, the gripping members, and actuating means therefor.

The interior turning-in device, which as a whole I have designated D, consists of the spear 43 and spear-grippers 44. The spear is shaped as shown in Fig. 5 and has at its ends a conical-tapered portion terminating in a point for insertion in the end of the tubular lacing. Back of the conical portion is a constricted portion or neck. The insertion of the spear in the end of the tubular lacing serves to distend or dilate that end of the lacing, as shown in Fig. 9, where the spear has just been inserted. The spear-grippers 44 serve to pinch the end of the lace against the neck of the spear behind the point of greatest diameter of the said spear-head, as seen in Fig. 10. The position of the parts just before the spear-grippers 44 pinch the end of the lacing against the neck of the spear 43 is clearly seen in Fig. 9, the two gripping members of the cutter-gripper A having just separated to permit the movement of the spear into the end of the lacing. I have beveled the adjacent edges of the grippers 10 and 11, so that the points of the spear may be inserted slightly in the extreme end of the lacing before the time when the said grippers 10 and 11 begin to separate.

In Fig. 10 it will be seen that the spear-grippers 44 have pinched the end of the lacing against the neck of the spear and that the spear and spear-grippers are about to continue their forward movement to turn in the end of the lacing. While this turning-in movement of the interior turning-in members is taking place the chuck members are in contact with the exterior of the lacing and prevent the longitudinal movement of that portion of the lace which lies within the chuck when the parts are in the position shown in Fig. 10, but allow the portion which lies to the left of the chuck, as seen in Fig. 9, to be turned in. The spear 43 and spear-grippers 44 continue to move together until the position shown in Fig. 11 is reached, when the turning in is completed. The chuck-jaws 61 and the spear-grippers 44 are then released, and the latter no longer pinch the lacing against the neck of the spear, but tend to spring apart and to distend the end of the lacing and hold it against the roughened surfaces 62 of the chuck-jaws 61, so that the turned-in portion of the lacing slips off the end of the spear and is not turned right side out again as the spear and spear-grippers retreat. The lacing is then left in the shape shown in Fig. 22, with the portion i' turned toward the end of the lacing in the position in which it has been left by the spear-grippers. This portion i' serves as a dam or obstruction to prevent the cement or stiffening material flowing into the body of the lacing.

Figure 12:
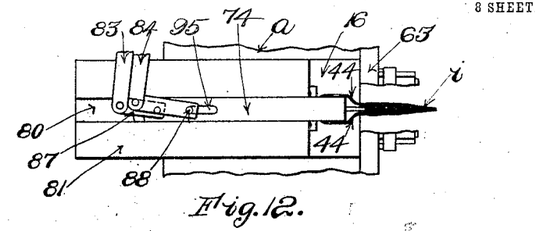

The movements of the interior turning-in members just described are imparted to them by the following mechanism: The spear 43 is mounted on the end of the spear-holder 74, which consists of a rectangular piece of metal having on its under side a slot 75 (see Fig. 5) for the reception of a slide 76. (Shown in dotted lines in Fig. 5 and in elevation in Fig. 2.) The slide 76 is provided at its forward end with a cross-piece 77, having mounted thereon a pair of pins 78 just outside the edge of the spear-holder 74. The two spear-grippers 44 are composed of suitable spring metal and are fast to the sides of the spear-holder 74. They are bent, as shown at 79, so that the pins 78 may ride up onto the side of the said spear-grippers, and thus compress them against the neck of the spear. The spear-holder 74 is slidably mounted in a groove 80 in the plate 81, fast to the frame of the machine. The pins 78 on the cross-piece 77 move in a space 82, milled out of the under side of the said plate 81. The proper movement is given to the spear-holder 74 and the slide 76 by means of cam-levers 83 and 84, (see Fig. 1,) pivoted to the frame of the machine at 85 and 86, and the links 87 and 88, respectively, the said cam-levers 83 and 84 being moved by cam-rolls 89 and 90, which travel in the cam-slots 91 and 92 of the cylinder-cam $c$ on the main shaft $b$. The link 87 is attached to the spear-holder 74 by a pin 93. The link 88 is attached to the slide 76 by a corresponding pin 94. A slot 95 is formed in the spear-holder 74 and permits a differential movement between the spear-holder 74 and the slide 76. The cam-slots 91 and 92 are so designed that the spear-holder 74 and the slide 76 move forward together at the beginning of the stroke until the spear 43 has entered the end of the lacing and the machine has reached the position shown in Fig. 9. The slide 76, having thereon the pins 78, is then moved forward to compress the spear-grippers 44 against the neck of the spear 43. This movement of the slide 76 relative to the spear-holder 74 is permitted by the slot 95. The parts are then in the position shown in Fig. 10, and the slide and spear-holder then move forward together to the position shown in Fig. 11, the actual turning in of the lacing being performed during this movement of the interior turning-in members. After the turning in is completed the slide 76 starts back, first releasing the spear-grippers and the portion of the lace held between the points of the spear-grippers and the neck of the spear, the parts then assuming the position shown in Fig. 12. Thereafter the spear-holder and slide move back together to the starting position, in which they rest while certain other operations upon the lacing are taking place.

I have not shown or described the particular shape of the grooves in the cylinder-cam $c$ because the design of such a cam is a matter of mere mechanical skill and forms no part of my invention.

Having now described the means by which the lacing is cut off and moved to the turning-in position and the means by which the portion of the lacing which extends beyond the end of the chuck C is turned in, I will now describe the transfer of the lacing to the dies, that being the point at which the lacing receives the composition which serves to stiffen and harden the tip under the action of the dies. The transfer of the lacing from the chuck C to the dies is accomplished by means of a group of elements which I will call for convenience the "lace-carrier" and designate by E. The lace-carrier E (see Figs. 2, 3, and 20) consists of a carrier-arm 96, which is provided at its upper end with the jaws 97 and 98 and is fast at its lower end upon the sliding rod 99. A set-screw 100 serves to adjust the position of the carrier-arm 96 relatively to the said sliding rod 99. The sliding rod 99 is mounted in the frame $a$ of the machine (see Fig. 2) and is slid in the direction of its longitudinal axis by means of the cam-lever 101, pivoted at 102 to the frame $a$ of the machine, the said cam-lever 101 and the sliding rod 99 being connected by a link 103 and a ball-and-socket joint 104, so that the sliding rod 99 has the capacity to rotate about its longitudinal axis as well as having the sliding movement previously described. The cam-lever 101 is provided with a cam-roll 1010, which moves in a cam-groove 1011 in the cylinder-cam $c$ of the main shaft $b$. The rotary movement about the axis of the sliding rod 99 is imparted to it by means of the cam-lever 105, pivoted at 106 to the frame $a$ of the machine and operated by a cam-slot 420 in the side of the plate-cam $f$. (See Fig. 1.) The end of the cam-lever 105 is connected by a link 107 to an arm 108, fast on the sliding rod 99. The movement of the cam-lever 105 pulls down the end of the arm 108 and causes the carrier-arm 96 to be rotated about the longitudinal axis of the said sliding rod 99.

Figures 3, 4, 18, 19, 20:
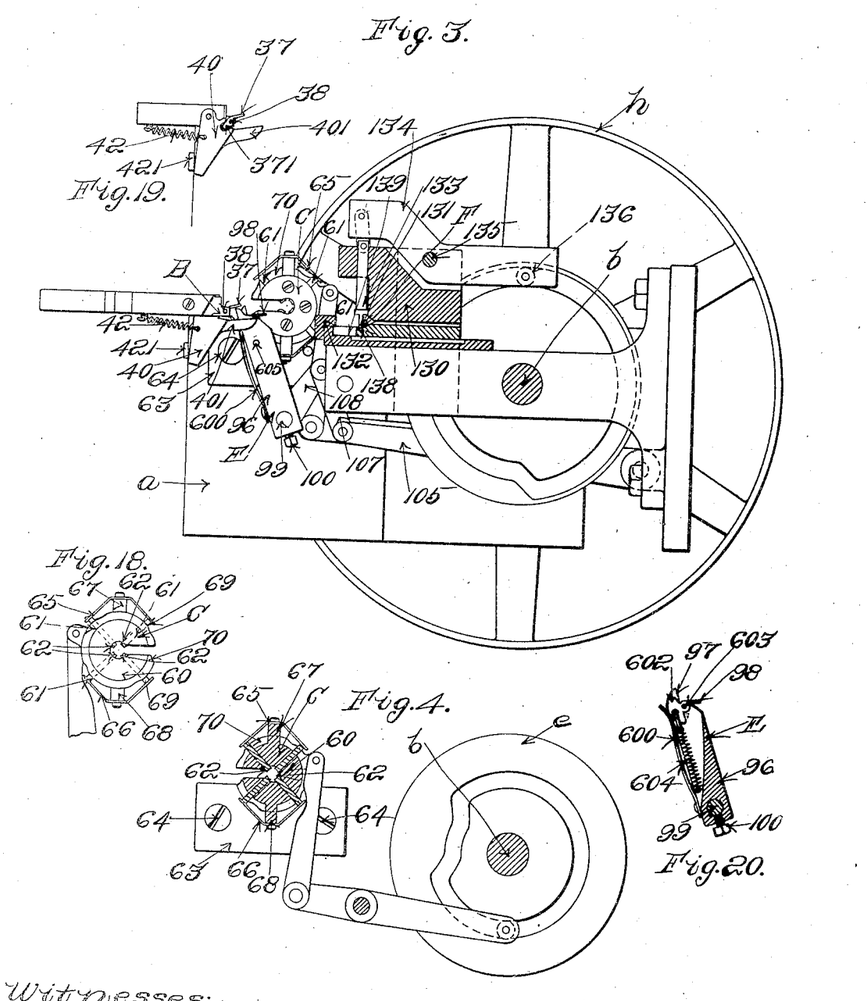
Fig. 3 is a section on line 3 3, Fig. 1, looking in the direction of the arrows.
Fig. 4 is a section on line 4 4, Fig. 1, looking in the direction of the arrows.
Fig. 18 is an end view of the chuck looking in the direction opposite to that of Figs. 3 and 4.
Fig. 19 is a detail of the side gripper.
Fig. 20 is a detail of the lace-carrier.
Figure 6:
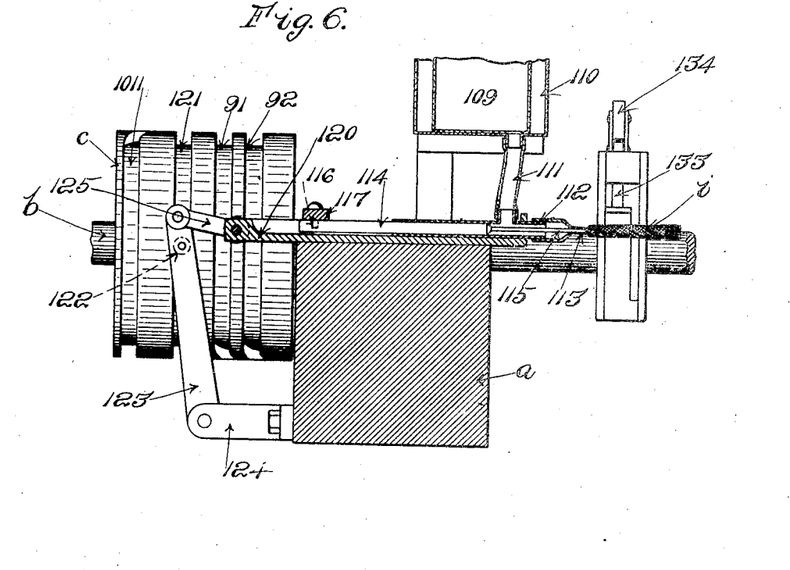
Fig. 6 is a section on line 6 6, Fig. 1, looking in the direction of the arrows.
Figure 7:
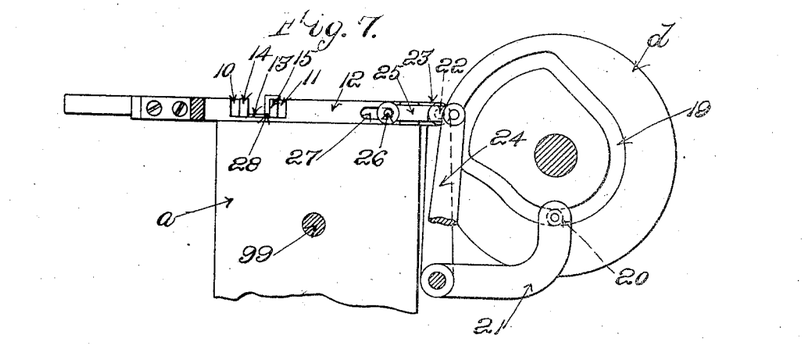
Fig. 7 is a detail of the cutter, cutter-grippers, and actuating means therefor.
Figure 13:
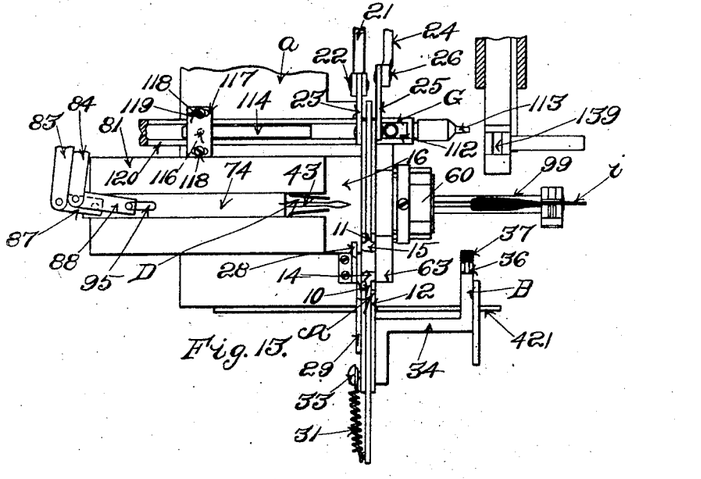
Fig. 13 illustrates the transfer of the lacing from the turning-in mechanism to the dies.
Figure 14:
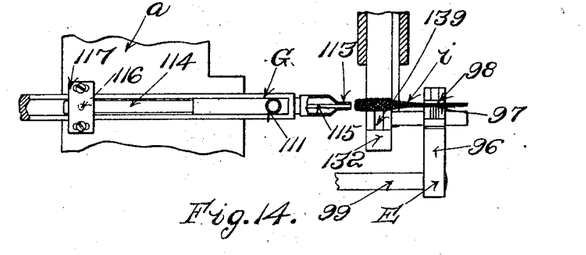
Fig. 14 shows the lacing in position about to be filled with the composition.
Figure 15:
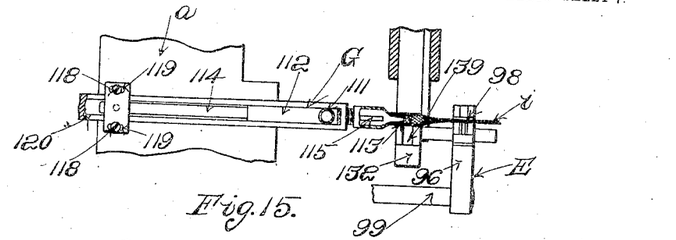
Figs. 15 and 16 illustrate subsequent positions of the filling and compressing mechanisms.
Figures 16, 21, 22, 23:
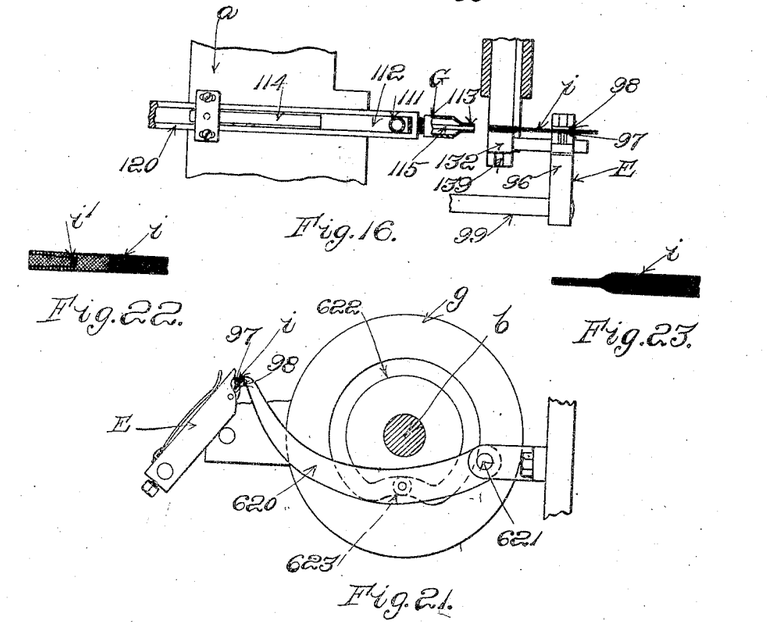
Fig. 21 is a detail of the mechanism which releases the completed lacing from the lace-carrier.
Fig. 22 is a section of the tip of a lacing after the turning-in operation has been performed.
Fig. 23 is a view of a completed lacing.
Figure 25:
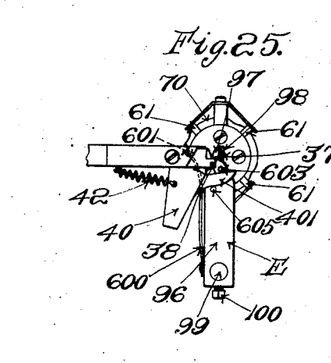
Fig. 25 is a view illustrating the operation of the lace-carrier and side gripper.

Referring now to Figs. 3, 9, and 25, I will explain the interaction between the side gripper B and the lace-carrier E by means of which the jaws of the said side gripper B are opened to release the lacing, and those of the lace-carrier E are closed to seize the lacing, the various actions taking place at the required times. When the machine is in the position shown in Figs. 1 and 3—that is, at the time when the lacing is being fed into position ready to be seized by the side gripper and brought to the turning-in position—the jaw of the side gripper is opened, as will be clearly seen in Fig. 3. When the said jaw 37 is closed by the cam-piece 40 (see Fig. 19) upon the lacing, the said side gripper B moves forward to the turning-in position and is followed in this movement by the lace-carrier E, which is rotated about the slide-rod 99. As the lace-carrier E rotates the upper edge of the spring 600 catches against the pin 601, (see Figs. 20 and 25,) so that the spring 600 is held away from the cam-piece 602, which is formed integral with the movable jaw 98 of the lace-carrier E, the said cam-piece 602 being pivoted at 603 to the carrier-arm 96. As soon as the spring 600 is held away from the cam-piece 602, against which it normally rests, the spring 604 pulls down the said cam-piece and closes the jaw 98 against the lacing. Later when the spring 600 snaps back against the back side of the cam-piece 602 the jaw remains closed owing to the shape given to the said cam-piece 602. For the purpose of opening the jaw of the side gripper B, I provide a pin 605, (see Figs. 3 and 25,) which contacts with the forwardly-projecting portion 401 of the cam-piece 40, causing it to move slightly about its pivot and open the jaw 37. As soon as the side gripper B is out of the way the lace-carrier E is caused to slide longitudinally by means of the sliding rod 99, withdrawing from the chuck C the turned-in end of the lacing which has just been released. When the position shown in Fig. 13 is reached, a "rest" in the cam-groove causes the lace-carrier to cease its longitudinal movement. At this point the end of the cam-lever 105 is depressed by the rotation of the plate-cam $f$, and the lace-carrier arm 96 is caused to revolve about the longitudinal axis of the sliding rod 99 until the end of the lace $i$ lies in the die F, by which character I designate the group of members which compresses the turned-in end of the lacing to form the finished tip. The lace-carrier E has also a further motion which I will describe later in connection with the cement-applying apparatus and the dies F. The lacing $i$, being now in the position indicated in Fig. 14 and held firmly by the lace-carrier E, as previously described, is filled with cement or other suitable flowing substance by means of a cement-applying apparatus G. This cement-applying apparatus G consists, essentially, of a suitable cement-can 109, which I have shown as surrounded by a steam or water jacket 110, the cement used being usually of such a nature that it is necessary to keep it warm while it is being applied. The cement-can is connected by a flexible connection 111 with a pump-cylinder 112, which is provided at its forward end with a tip 113 of convenient size for insertion in the dilated end of the lacing $i$. Within the pump-cylinder is a piston 114, which is of a size to completely fill the cylinder back of the point of entrance of the flexible connection 111 when the parts are in the position shown in Fig. 6. The forward end of the piston 114 consists of a wire 115 of a diameter substantially equal to that of the interior bore of the pointed pump-tip 113. This piston 114 is stationary, being attached at its rear end by a pin 116 to a cross-piece 117, which is screwed or otherwise suitably attached to the frame $a$ of the machine at 118. I provide the plate 117 with slots 119, so that a slight adjustment of the position of the piston may be had, if desired. The pump-cylinder 112 is mounted on a slide 120 with capacity to slide in the frame of the machine. The slide 120 is given a longitudinal movement by means of the groove 121 in the cylinder-cam $c$, which groove moves a cam-roll 122, pivoted on a cam-lever 123, which is itself pivoted to a bracket 124 on the frame $a$ of the machine. The upper end of the said cam-lever 123 is connected by a link 125 to the said pump-slide 120. It will thus be seen that the pumping action of the pump occurs by reason of the fact that the pump-cylinder is moved, while the pump-piston remains stationary instead of in the ordinary manner, in which the piston is movable and the cylinder stationary. The forward end of the pump-piston 115 always remains very close to the distended end of the lacing when in the position shown in Figs. 6 and 14. The interior of the pump-cylinder 112 and tip 113 thereof is filled with the cementitious material by gravity and also by suction during the forward movement of the pump-cylinder as it is inserted into the distended end of the lacing $i$, the tip 113 of pump-cylinder 112 being closed during the first part of this movement by the forward end of the pump-piston or wire 115. When the cam $c$ causes the pump-cylinder to begin its backward motion, the main portion 114 of the pump-piston fills the tip 113 of the pump-cylinder with cement. The continued backward movement of said pump-cylinder causes the wire 115 to enter the tip 113, thus cutting off the further admission of cement from the reservoir. The further backward movement of the pump-cylinder forces the cement in the tip out of the said tip into the distended portion of the lacing. As soon, however, as the small portion of the pump-piston 115 enters the bore of the pump-cylinder point only so much of the cement is thereafter forced into the lacing as is contained in the contracted bore of the tip, the further movement of the enlarged part of the pump-piston serving only to force the superfluous cement back into the cement-can 109. It will thus be seen that by adjusting the fixed position of the pump-piston 144 by means of the screws and slots 118 and 119, respectively, I am enabled to regulate or measure with great exactness the amount of cement which is deposited within the end of the lacing. By reason of the fact that the cement is ejected during the backward movement of the pump-cylinder the cement is laid evenly the entire length of the tip, thus insuring it even distribution. As soon as the pump-cylinder point 113 is withdrawn from the lacing the lace-carrier E is moved again by the sliding rod 99 and cam-slot 1011, so that the end of the distended portion of the lacing is flush with the left-hand side of the die F, as seen in Fig. 16.

Figure 24:
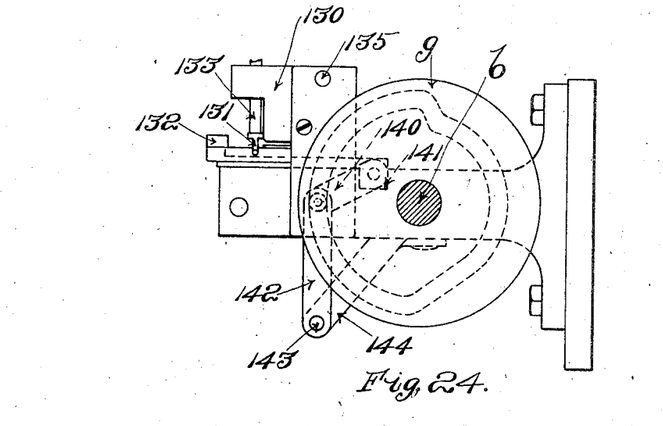
Fig. 24 is a detail of a part of the die-operating mechanism.

The die F is constructed in the following manner: On the frame $a$ of the machine there is located a block 130, which serves to support and guide the various members composing the die. The die proper is made in three parts—namely, the bottom die member 138, formed integral with the block 130, the top die member 131, and the side die member or guide 132. The top die member is carried upon a spindle 133, guided in the block, which is forwardly projected at the top for that purpose. The top die 131 is moved by means of a cam-lever 134, pivoted at 135 to the block 130 and operated by means of a cam-roll 136 in the cam-slot 137, formed in the cam $f$, heretofore referred to. The rotation of this cam $f$ depresses the die 131 and holds it in the depressed position for the desired length of time. The lower edge of the top die member 131 and the die-groove of the bottom die 138 are cut to the proper shape required for the finished lacing-tip. The side die member or guide 132 assists in properly positioning the lacing for receiving the cement and for its compression between the top die 131 and the bottom die 138. For this purpose I make the side die member 132 in such a shape that it may open quite widely to permit the dilated lacing to be laid in place just prior to the time when the said lacing is supplied with cement by the cement-applying devices. The said side die 132 is slidably mounted in a groove 139 in the frame $a$ of the machine. The side die 132 (see Fig. 24) is moved forward and back in the said groove by means of a link 140, attached at one end to a downwardly-bent portion 141 of the said side guide 132. At its other end the link 140 is connected by a second link 142, pivoted at its lower end 143 to a projection 144 of the frame $a$ of the machine.

I have found in the operation of my machine that sometimes the lacing $i$ in being transferred by the lace-carrier E to the cement-applying position becomes slightly bent or otherwise distorted, so that its end does not exactly register with the center of the line of the cement-applying apparatus. I have therefore timed the cam $g$, so that the side die is moved toward the other two die members and pushes the lacing into the proper position before the tip of the cement-applying apparatus enters the dilated end of the said lacing. Afterward just prior to the time when the top die 131 descends to compress the lacing into the bottom die 130 the said side die member completes its movement toward the right, thus assisting to hold the lacing in proper position as the top die descends.

In order that the lacing $i$ may be released from the lace-carrier E after the dies have closed upon the tip of the lacing, I provide an arm or hook 620, pivoted at 621 to the frame $a$ of the machine and operated by a cam-groove 622 and cam-roll 623. The cam-groove 622 is cut in the cam $g$, this being the cam described in connection with Fig. 24, which operates the side die 132. The tip of the hook or arm 620 contacts with the top edge of the movable jaw 98 of the lace-carrier and opens it at the desired time.

I have timed the cam $f$, which operates the top die, so that the die remains closed during a considerable portion of the cycle of the machine in order that the cement or other stiffening material used may be given sufficient opportunity to set or harden.

While I have not described particularly the construction of the various cams which operate the separate groups of elements which perform the different operations, since I believe the timing of these cams to be only a matter of mechanical skill, nevertheless it will be seen that the various cams are timed so that the operations take place substantially in the order described and the proper portions of the cycle of movement of the machine are given to each of the various operations. It will thus be seen that the interior turning-in members D are standing still during the time in which the other operations are being performed upon the lacing; also that the cutter-gripper A and the side gripper B remain in the position shown in Fig. 1 for a considerable length of time, thus allowing the next length of lacing to be fed into position—namely, that in which the cement filling of the tip, its compression, and the return of the lace-carrier to the position shown in Fig. 1 is taking place. This proper interrelation of the different groups of mechanism is all cared for by the timing of the different parts.

What I claim is—

1. In a machine of the character described, in combination turning-in mechanism, cement-applying mechanism, and compressing mechanism.

2. In a machine of the character described, the combination with transferring mechanism, of turning-in mechanism, cement-applying mechanism, and compressing mechanism.

3. In a machine of the character described the combination of an exterior turning-in member, and an interior turning-in member coöperating therewith.

4. In a machine of the character described the combination of exterior turning-in mechanism, and interior turning-in mechanism comprising a central support, and grippers coöperating with the said central support 5. Turning-in mechanism comprising a central support for the lacing, grippers therefor, and holding members contacting with the outside of the lacing while upon the central support.

6. Turning-in mechanism, comprising a central support or spear for the lacing, grippers therefor, and a chuck engaging the outside of the lacing during the turning-in movement.

7. Turning-in mechanism, comprising a central support or spear for the lacing, grippers therefor, and a chuck provided with radially-movable members engaging the outside of the lacing during the turning-in movement.

8. Turning-in mechanism comprising a central support or spear for dilating the end of a lacing said central support or spear being provided with an end portion for insertion in the lace, and having a contracted portion or neck back of said end portion, holding means coöperating with the neck of the said central support or spear to grip the end of the lacing, and exterior members contacting with the lacing upon the said central support or spear.

9. Turning-in mechanism comprising a central support or spear for dilating the end of a lacing said central support or spear being provided with a tapering portion for insertion in the lacing, and having a contracted portion or neck back of said tapering portion, holding means coöperating with the neck of the said central support or spear to grip the end of the lacing, and exterior members having a roughened interior surface contacting with the lacing upon the said central support or spear at its point of greatest diameter.

10. In a machine of the character described, the cement-applying apparatus, comprising a fixed piston, and a cylinder provided with a tip for introduction into the article to which the cement is to be applied, said cylinder being relatively movable with relation to its piston whereby the cement is ejected from the tip and is laid in the article during the backward movement of the said cylinder.

11. In a machine of the character described, the cement-applying mechanism comprising a movable pump-cylinder provided with a tip having a constricted bore, a fixed piston comprising two portions one of a size corresponding with the interior of the pump-cylinder and the other with that of bore of the tip.

12. In a machine of the character described, the cement-applying apparatus, comprising a movable cylinder provided with a tip having a constricted bore, means for supplying cement to the said cylinder, a fixed piston having one portion thereof of a size to fit the main part of the cylinder and another portion of a size to fit said constricted bore.

13. In a machine of the character described, the cement-applying apparatus, comprising a movable cylinder provided with a tip having a constricted bore, means supplying cement to the said cylinder, a fixed piston having one portion of a size to fit the main part of the cylinder and another portion of a size to fit the said constricted bore, and moving means for the said cylinder whereby the cement is ejected during the backward movement of the cylinder.

14. In a machine of the character described, the cement-applying apparatus, comprising a movable cylinder provided with a tip having a constricted bore, means supplying cement to the said cylinder, a piston fixed with relation to the said cylinder having one portion of a size to fit the main part of the cylinder and another portion of a size to fit the said constricted bore, moving means for the said cylinder, and adjusting means for the said piston whereby the quantity of the cement ejected during backward movement of the said cylinder may be varied.

15. In a machine of the character described, the combination with turning-in mechanism, cement-applying mechanism, and compressing mechanism, of a cutter-gripper and a side gripper holding the lacing or other article during its transfer from the feeding position to the turning-in position.

16. In a machine of the character described, the combination with turning-in mechanism, cement-applying mechanism, and compressing mechanism, of a lace-carrier for transferring the turned-in lacing from the turning-in position to the compressing position.

17. In a machine of the character described, the combination with turning-in mechanism, cement-applying mechanism, and compressing mechanism of a lace-carrier comprising an arm, gripping members thereon, a rotatable slide-rod upon which the said arm is mounted, and a pair of cams one for imparting to the said lace-carrier a rectilinear motion, and the other imparting to the lace-carrier a rotary motion whereby the lacing is transferred from the turned-in position to the compressing position.

In testimony whereof I affix my signature in presence of two witnesses.

CHARLES F. PINKHAM.

Witnesses:
 WM. A. MACLEOD,
 J. HENRY PARKER.